United States Patent
Noda et al.

(10) Patent No.: US 8,212,905 B2
(45) Date of Patent: Jul. 3, 2012

(54) PHOTOELECTRIC CONVERSION DEVICE, IMAGING SYSTEM, AND PHOTOELECTRIC CONVERSION DEVICE DRIVING METHOD

(75) Inventors: Tomoyuki Noda, Kawasaki (JP); Masaru Fujimura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 12/624,811

(22) Filed: Nov. 24, 2009

(65) Prior Publication Data

US 2010/0149366 A1   Jun. 17, 2010

(30) Foreign Application Priority Data

Dec. 15, 2008   (JP) .................................. 2008-318939

(51) Int. Cl.
  *H04N 3/14*   (2006.01)
  *H04N 5/335*   (2011.01)
(52) U.S. Cl. .......................... 348/301; 348/241; 348/308
(58) Field of Classification Search .......................... None
  See application file for complete search history.

(56) References Cited

U.S. PATENT DOCUMENTS

| | | | |
|---|---|---|---|
| 6,960,751 B2 | 11/2005 | Hiyama et al. | 250/208.1 |
| 7,382,011 B2 | 6/2008 | Noda et al. | 257/292 |
| 7,429,764 B2 | 9/2008 | Koizumi et al. | 257/292 |
| 7,518,096 B2 | 4/2009 | Noda | 250/214.1 |
| 7,561,199 B2 | 7/2009 | Noda et al. | 348/308 |
| 2006/0044414 A1* | 3/2006 | Lee et al. | 348/230.1 |
| 2006/0203123 A1* | 9/2006 | Kasai | 348/372 |
| 2006/0227226 A1* | 10/2006 | Olsen | 348/241 |
| 2007/0126886 A1 | 6/2007 | Sakurai et al. | 348/222.1 |
| 2008/0062295 A1 | 3/2008 | Fujimura et al. | 348/301 |
| 2008/0062296 A1 | 3/2008 | Ogura et al. | 348/308 |
| 2008/0158403 A1 | 7/2008 | Itano et al. | 348/308 |
| 2008/0273093 A1 | 11/2008 | Okita et al. | 348/220.1 |
| 2008/0284891 A1* | 11/2008 | Hattori | 348/308 |
| 2009/0219424 A1 | 9/2009 | Sonoda et al. | 348/302 |

FOREIGN PATENT DOCUMENTS

JP   2008-042676 A   2/2008

* cited by examiner

*Primary Examiner* — Lin Ye
*Assistant Examiner* — Dennis Hogue
(74) *Attorney, Agent, or Firm* — Fitzpatrick, Cella, Harper & Scinto

(57) ABSTRACT

A photoelectric conversion device comprises a plurality of pixels, a driving supplemental element, a signal line to which the plurality of pixels and the driving supplemental element are connected, a driving unit which drives the plurality of pixels and the driving supplemental element, and an output circuit which processes a signal output to the signal line from a readout pixel selected by the driving unit and outputs the processed signal, each of the plurality of pixels including a first charge-voltage converter, a first reset unit which resets the first charge-voltage converter, and a first output unit which outputs a signal corresponding to a voltage of the first charge-voltage converter, the driving supplemental element including a second charge-voltage converter, a second reset unit which resets the second charge-voltage converter, and a second output unit which outputs a signal corresponding to a voltage of the second charge-voltage converter.

17 Claims, 9 Drawing Sheets

F I G. 2
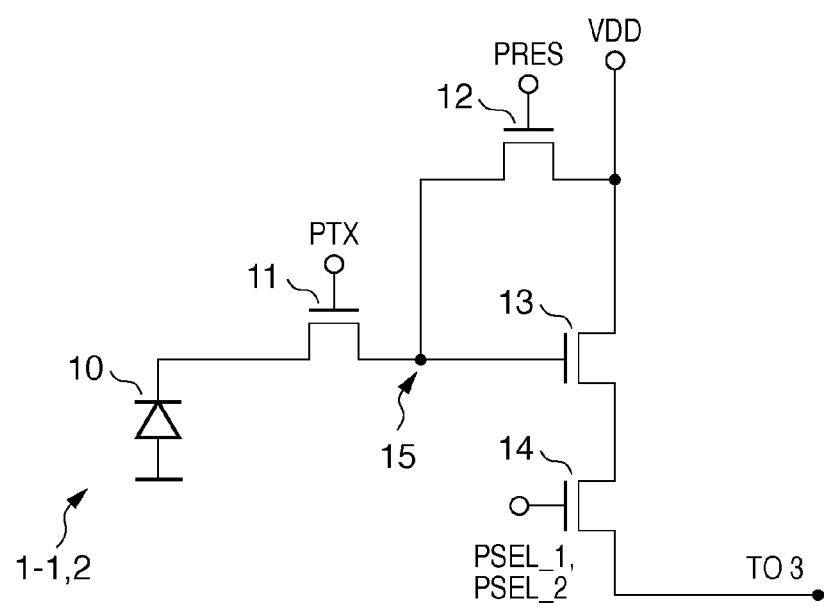

F I G. 3
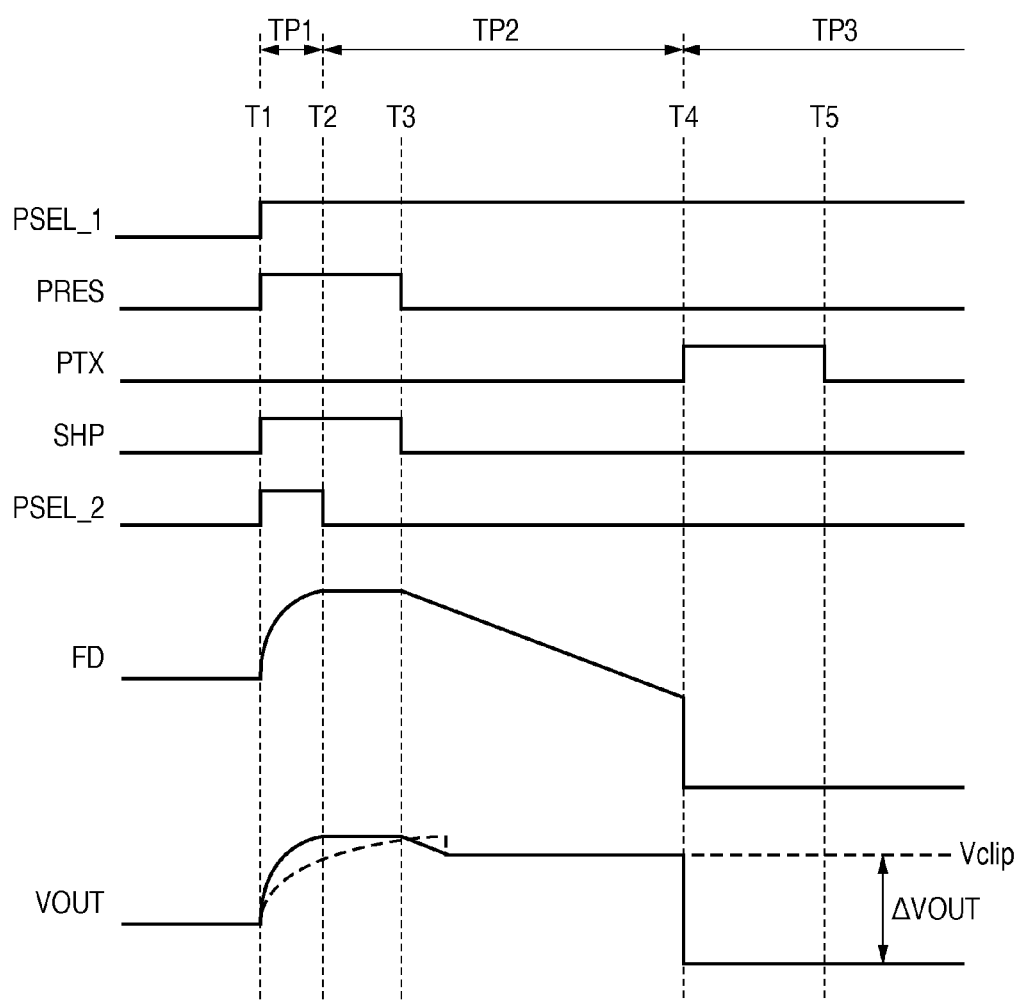

PHOTOELECTRIC CONVERSION DEVICE, IMAGING SYSTEM, AND PHOTOELECTRIC CONVERSION DEVICE DRIVING METHOD

BACKGROUND OF THE INVENTION

1. Field of the Invention

The present invention relates to a photoelectric conversion device, imaging system, and photoelectric conversion device driving method.

2. Description of the Related Art

Recently, CMOS sensors, which are of an amplification type among photoelectric conversion devices, have widely been used in digital cameras and video cameras because they can provide high image qualities and high resolutions. When the CMOS sensor is irradiated with very strong light as in photographing the sun, charge sometimes leaks from a photodiode to a floating diffusion (to be referred to as an FD) in a pixel irradiated with the strong light. As a result, a signal output to a signal line from an amplification transistor in the pixel irradiated with the strong light in accordance with the FD voltage attenuates abruptly. The level of an image signal (see ΔVOUT shown in FIG. 10) corresponding to this signal drops to black level. This phenomenon is called high-brightness darkening.

To prevent this, Japanese Patent Laid-Open No. 2008-42676 discloses a technique of holding the potential of a signal line, raising the held potential by the threshold voltage of the amplification transistor of a pixel, and then supplying it to the gate of the transistor of a clipping unit 230, as shown in FIG. 1 of Japanese Patent Laid-Open No. 2008-42676. According to Japanese Patent Laid-Open No. 2008-42676, even a small amount of charges leaking to the FD can be detected at high precision to clip the potential of the signal line. This technique is considered to be able to satisfactorily prevent the tone of a pixel corresponding to the signal line potential from dropping to black level.

As the number of pixels of a photoelectric conversion device is increasing, miniaturization of pixels is being promoted. Now, 10-megapixel or more CMOS sensors with a pixel size of 2 μm or smaller are commercially available. At the same time, users request many functions of cameras using CMOS sensors, and demand is particularly high for a high-speed continuous shooting function. To provide it, CMOS sensors need to shorten the readout period for reading out signals from pixels.

However, an increasing number of pixels of a photoelectric conversion device lead to a larger number of pixels connected to a signal line. This makes the signal line longer and its parasitic capacitance larger. As the pixel size becomes smaller, the wiring width of the signal line decreases and its parasitic resistance increases. The time constant becomes large when driving a transistor to raise the signal line potential to a predetermined potential. The time necessary for driving becomes long. In this case, a long time is taken to output a noise signal appropriate for the voltage of an FD (charge-voltage converter) in a pixel to a signal line from an amplification transistor (output unit) while resetting the FD. A period for transferring the appropriate noise signal from the pixel to a CDS circuit (output circuit) also becomes long.

SUMMARY OF THE INVENTION

It is an object of the present invention to shorten a period for transferring an appropriate noise signal from a pixel to an output circuit.

One of the aspects of the present invention provides a photoelectric conversion device comprising a plurality of pixels, a driving supplemental element, a signal line to which the plurality of pixels and the driving supplemental element are connected, a driving unit which drives the plurality of pixels and the driving supplemental element, and an output circuit which processes a signal output to the signal line from a readout pixel selected by the driving unit and outputs the processed signal, each of the plurality of pixels including a first charge-voltage converter, a first reset unit which resets the first charge-voltage converter, and a first output unit which outputs a signal corresponding to a voltage of the first charge-voltage converter, the driving supplemental element including a second charge-voltage converter, a second reset unit which resets the second charge-voltage converter, and a second output unit which outputs a signal corresponding to a voltage of the second charge-voltage converter, wherein the driving unit drives the plurality of pixels and the driving supplemental element to, during a first period which is in a selection period for selecting the readout pixel, in the readout pixel, reset the first charge-voltage converter by the first reset unit and then output a noise signal corresponding to the voltage of the first charge-voltage converter from the first output unit to the signal line, and in the driving supplemental element, reset the second charge-voltage converter by the second reset unit and then output a noise signal corresponding to the voltage of the second charge-voltage converter from the second output unit to the signal line, and in a second period which follows the first period and which is in the selection period, stop output of the noise signal to the signal line from the second output unit in the driving supplemental element, and the noise signal output to the signal line from the first output unit in the readout pixel is transferred to the output circuit in the second period.

The present invention can shorten a period for transferring an appropriate noise signal from a pixel to an output circuit.

Further features of the present invention will become apparent from the following description of exemplary embodiments with reference to the attached drawings.

BRIEF DESCRIPTION OF THE DRAWINGS

FIG. 2 is a circuit diagram showing the structure of a pixel or driving supplemental pixel in the first embodiment of the present invention;

FIG. 3 is a timing chart showing the operation of the photoelectric conversion device 100 according to the first embodiment of the present invention;

DESCRIPTION OF THE EMBODIMENTS

In this specification, a pixel means one photoelectric conversion unit and the minimum unit of an element set for reading out a signal from the photoelectric conversion unit to a signal line. The minimum unit of the element set can be formed by sharing elements between adjacent photoelectric conversion units. Also in this case, the minimum unit of the element set is regarded as that for reading out a signal from one photoelectric conversion unit, and is defined as a pixel.

A case in which a period for transferring an appropriate noise signal from a pixel to an output circuit cannot be shortened will be explained in detail.

According to the technique disclosed in Japanese Patent Laid-Open No. 2008-42676, the potential of a signal line is set to a predetermined one by performing a source follower operation by either the amplification transistor of a pixel or the transistor of a clipping unit 230 during the readout period together with a constant current source connected to the signal line. In this case, either the amplification transistor of the pixel or the transistor of the clipping unit 230 tends to take time until the signal line potential rises to a predetermined potential. This makes it difficult to shorten the period for transferring a signal from a pixel to an output circuit.

Figure 10:
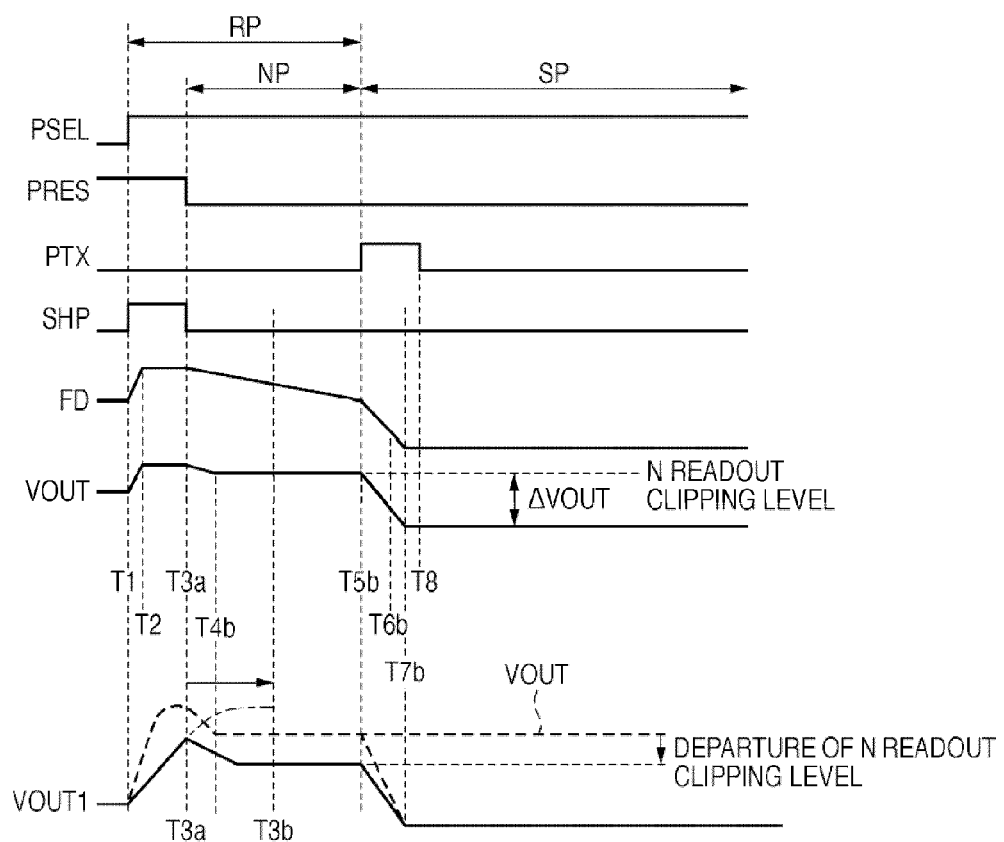
FIG. 10 is a timing chart for explaining a problem.

For example, in a photoelectric conversion device having many pixels, the signal line potential changes as shown in FIG. 10. In FIG. 10, a period between timings T1 and T5b will be called a reset period RP. A period between timings T3a and T5b will be called a noise readout period NP. A period after timing T5b will be called a signal readout period SP. In the noise readout period NP, a noise signal is read out from a pixel to a signal line while the pixel is reset. In the signal readout period SP, charges are transferred from a photoelectric conversion unit to an FD in the pixel during the period between T5b and T8, and an optical signal corresponding to the voltage of the FD upon receiving the charges is read out from the pixel to the signal line.

Referring to FIG. 10, waveforms PSEL to VOUT are cited from FIG. 2 of Japanese Patent Laid-Open No. 2008-42676. A waveform VOUT1 represents a change of the signal line potential when the number of pixels of a photoelectric conversion device increases. In FIG. 10, the waveform VOUT indicated by a broken line overlaps the waveform VOUT1 indicated by a solid line for comparison.

If the number of pixels of a photoelectric conversion device is not so large, the signal line potential VOUT stabilizes at a potential corresponding to the FD voltage during the period between T1 and T3a in which a sample-and-hold pulse SHP is at active level, as indicated by the broken line in FIG. 10. In contrast, if the number of pixels of the photoelectric conversion device increases, the parasitic capacitance of the signal line increases, and pixels are miniaturized to increase the parasitic resistance of the signal line, the signal line potential VOUT1 changes as indicated by the solid line in FIG. 10, and the N readout clipping level departs. In this case, the high-brightness darkening phenomenon cannot be fully suppressed.

If the end of the period in which the sample-and-hold pulse SHP is at active level is extended from T3a to T3b, the signal line potential VOUT1 stabilizes at a potential corresponding to the FD voltage, as indicated by a chain line in FIG. 10. That is, to properly perform a signal line potential clipping operation for sufficiently suppressing the high-brightness darkening phenomenon, it is necessary to prolong the period (period obtained by excluding the noise readout period NP from the reset period RP) in which the sample-and-hold pulse SHP is at active level. This, however, obstructs speeding up the operation to read out a signal from a pixel. It becomes difficult to shorten the period (sum of the reset period RP and signal readout period SP) for reading out a signal from a pixel.

Figure 1:
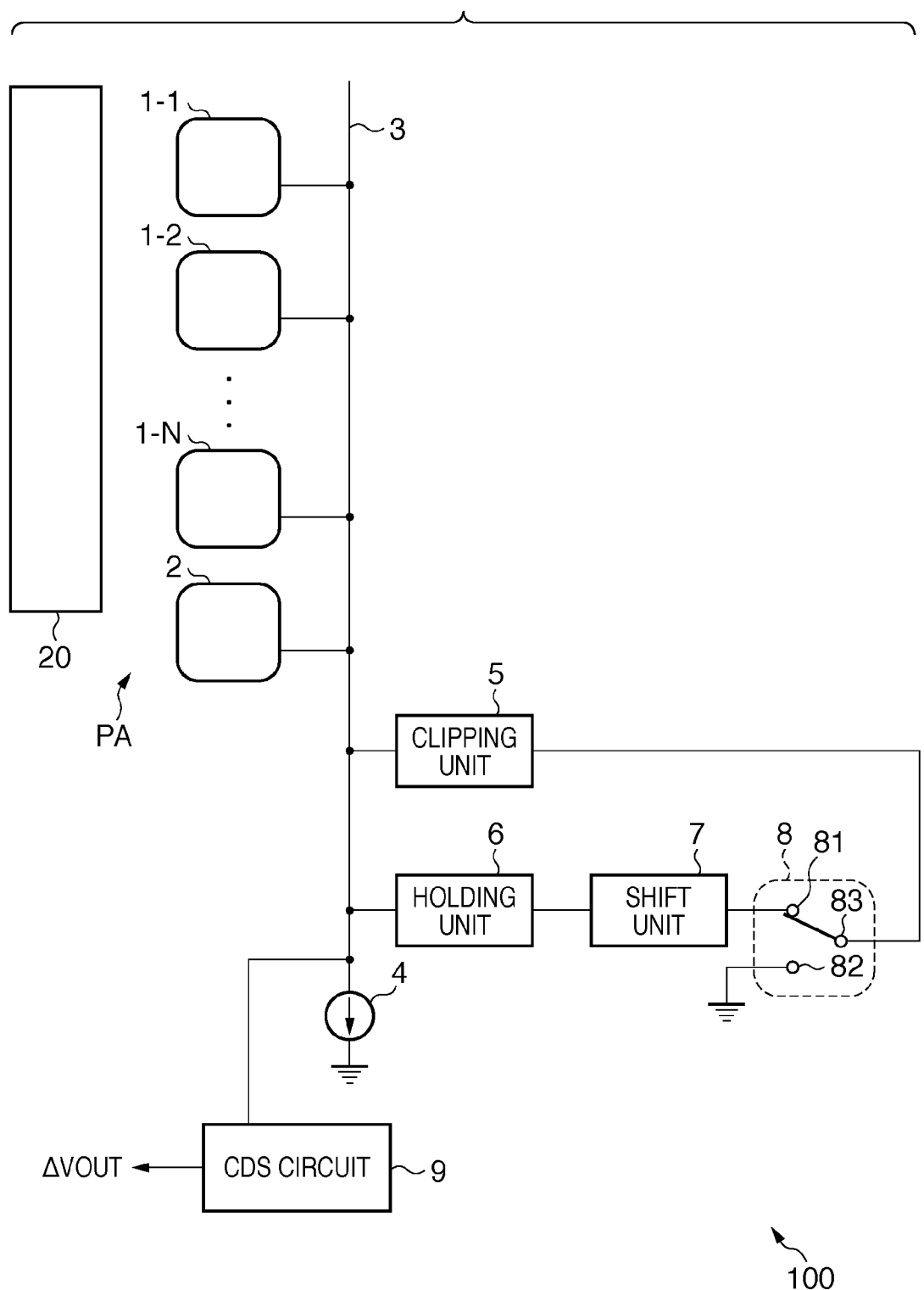
FIG. 1 is a diagram showing the circuit arrangement of a photoelectric conversion device 100 according to the first embodiment of the present invention.

A photoelectric conversion device 100 according to the first embodiment of the present invention will be described with reference to FIG. 1. FIG. 1 is a diagram showing the circuit arrangement of the photoelectric conversion device 100 according to the first embodiment of the present invention.

The photoelectric conversion device 100 includes a plurality of pixels 1-1 to 1-N, a plurality of driving supplemental pixels 2, a plurality of signal lines 3, a vertical scanning circuit (driving unit) 20, a plurality of holding units 6, a plurality of shift units 7, and a plurality of switching units 8. The photoelectric conversion device 100 includes a plurality of clipping units 5 and a plurality of CDS circuits (output circuits) 9.

The pixels 1-1 to 1-N and the driving supplemental pixels 2 are arrayed in the row and column directions to form a pixel array PA. The row direction is a direction along rows in the pixel array PA. The column direction is a direction along columns in the pixel array PA. FIG. 1 shows only circuits for one column in the pixel array PA for descriptive convenience.

On each column of the pixel array PA, the pixels 1-1 to 1-N and the driving supplemental pixel (driving supplemental element) 2 are arranged adjacent to each other in the column direction. The pixels 1-1 to 1-N and the driving supplemental pixel 2 have the same structure, for example, a structure shown in FIG. 2. FIG. 2 is a circuit diagram showing the structure of the pixel or driving supplemental pixel in the first embodiment of the present invention.

The pixel (each of the pixels 1-1 to 1-N and the driving supplemental pixel 2) shown in FIG. 2 includes a photoelectric conversion unit 10, transfer unit 11, charge-voltage converter 15, reset unit 12, output unit 13, and selection unit 14.

The photoelectric conversion unit (the first photoelectric conversion unit of each pixel or the second photoelectric conversion unit of the driving supplemental pixel 2) 10 generates charges corresponding to light and stores them. The photoelectric conversion unit 10 is, for example, a photodiode.

The transfer unit 11 (the first transfer unit of each pixel or the second transfer unit of the driving supplemental pixel 2) transfers charges from the photoelectric conversion unit 10 to the charge-voltage converter 15. The transfer unit 11 is, for example, a transfer transistor. When the vertical scanning circuit 20 supplies an active-level transfer control signal PTX to the gate, the transfer unit 11 is turned on to transfer charges from the photoelectric conversion unit 10 to the charge-voltage converter 15.

The charge-voltage converter (the first charge-voltage converter of each pixel or the second charge-voltage converter of the driving supplemental pixel 2) 15 converts transferred charges into a voltage. The charge-voltage converter 15 is, for example, a floating diffusion (floating diffusion capacitance).

The reset unit (the first reset unit of each pixel or the second reset unit of the driving supplemental pixel 2) 12 resets the charge-voltage converter 15. The reset unit 12 is, for example, a reset transistor. When the vertical scanning circuit 20 supplies an active-level reset control signal PRES to the gate, the reset unit 12 is turned on to reset the charge-voltage converter 15.

The output unit (the first output unit of each pixel or the second output unit of the driving supplemental pixel 2) 13 outputs, to the signal line 3, a signal corresponding to the voltage of the charge-voltage converter 15. The output unit 13 is, for example, an amplification transistor. The output unit 13 performs a source follower operation together with a constant current source 4 connected to the signal line 3, thereby outputting, to the signal line 3, a signal corresponding to the voltage of the charge-voltage converter 15. More specifically, the output unit 13 outputs, to the signal line 3, a noise signal corresponding to the voltage of the charge-voltage converter 15 while the reset unit 12 resets the charge-voltage converter 15. The output unit 13 outputs, to the signal line 3, an optical signal corresponding to the voltage of the charge-voltage converter 15 while the transfer unit 11 transfers charges from the photoelectric conversion unit 10 to the charge-voltage converter 15.

The selection unit (the first selection unit of each pixel or the second selection unit of the driving supplemental pixel 2) 14 selects/deselects a pixel. The selection units (first selection units) 14 of the pixels 1-1 to 1-N are, for example, selection transistors. When the vertical scanning circuit 20 supplies an active-level selection control signal PSEL_1 to the gates, the selection units 14 of the pixels 1-1 to 1-N are turned on to select the pixels. When the vertical scanning circuit 20 supplies an inactive-level selection control signal PSEL_1 to the gates, the selection units 14 of the pixels 1-1 to 1-N are turned off to deselect the pixels. Similarly, the selection unit (second selection unit) 14 of the driving supplemental pixel 2 is, for example, a selection transistor. When the vertical scanning circuit 20 supplies an active-level selection control signal PSEL_2 to the gate, the selection unit 14 of the driving supplemental pixel 2 is turned on to select the pixel. When the vertical scanning circuit 20 supplies an inactive-level selection control signal PSEL_2 to the gate, the selection unit 14 of the driving supplemental pixel 2 is turned off to deselect the pixel.

A plurality of signal lines 3 correspond to a plurality of columns in the pixel array PA. Each signal line 3 is connected to pixels on a corresponding column in the pixel array PA. The signal line 3 transfers signals (noise signal and optical signal) output from pixels. FIG. 1 shows the signal line 3 connected to the pixels 1-1 to 1-N and the driving supplemental pixel 2.

The vertical scanning circuit 20 scans the pixel array PA in the vertical direction (column direction) to select a row (to be referred to as a readout row) from which signals are to be read out in the pixel array PA. The vertical scanning circuit 20 drives pixels (readout pixels) on the readout row to output signals from them.

A plurality of holding units 6 correspond to a plurality of signal lines 3. Each holding unit 6 is connected to a corresponding signal line 3. The holding unit 6 holds the potential of the signal line 3. The holding unit 6 outputs a voltage corresponding to the held potential of the signal line 3 to the shift unit 7.

A plurality of shift units 7 correspond to a plurality of holding units 6. Each shift unit 7 is connected to a corresponding holding unit 6. The shift unit 7 receives the output voltage of the holding unit 6 and shifts the received output voltage of the holding unit 6. The shift unit 7 outputs the shifted voltage to the switching unit 8.

A plurality of switching units 8 correspond to a plurality of shift units 7. Each switching unit 8 is connected to a corresponding shift unit 7. The switching unit 8 switches between the first state in which the shift unit 7 and clipping unit 5 are connected and the second state in which the ground power supply and clipping unit 5 are connected. More specifically, the switching unit 8 includes a N readout terminal 81, S readout terminal 82, and connection terminal 83. The switching unit 8 switches to the first state by connecting the N readout terminal 81 and connection terminal 83 in the period (see a second period TP2 shown in FIG. 3) for reading out a noise signal from a pixel. The switching unit 8 switches to the second state by connecting the S readout terminal 82 and connection terminal 83 in the period (see a third period TP3 shown in FIG. 3) for reading out an optical signal from a pixel. The switching unit 8 transfers the output voltage of the shift unit 7 to the clipping unit 5 in the first state, and the ground voltage to the clipping unit 5 in the second state.

A plurality of clipping units 5 correspond to a plurality of switching units 8. Each clipping unit 5 is connected to a corresponding switching unit 8. In the first state, the clipping unit 5 receives the output voltage of the shift unit 7. The clipping unit 5 clips the potential of the signal line 3 in accordance with the received output voltage of the shift unit 7.

For example, when the output unit 13 in each of the pixels 1-1 and 1-N and the driving supplemental pixel (driving supplemental element) 2 is an NMOS amplification transistor, the clipping unit 5 includes an NMOS transistor which receives, at its gate, a voltage transferred from the switching unit 8. The NMOS transistor receives a power supply voltage at its drain, and clips the potential of the signal line 3 by using, as a clipping potential, a source potential decreased by a threshold voltage from the output voltage of the shift unit 7 received at its gate. More specifically, when the potential of the signal line 3 drops to be equal to or lower than the clipping potential, the clipping unit 5 performs a source follower operation together with the constant current source 4 to raise the potential of the signal line 3 to the clipping potential and clip the raised potential. The clipping potential is arbitrarily set within the range of a level lower than an ideal noise signal to a level higher than an optical signal. In the second state, the clipping unit 5 receives a ground voltage. The clipping unit 5 is turned off in accordance with the received ground voltage.

Alternatively, when the output unit 13 in each of the pixels 1-1 and 1-N and the driving supplemental pixel (driving supplemental element) 2 is a PMOS amplification transistor, the clipping unit 5 includes a PMOS transistor which receives, at its gate, a voltage transferred from the switching unit 8. The PMOS transistor receives a ground voltage at its drain, and clips the potential of the signal line 3 by using, as a clipping potential, a source potential increased by a threshold voltage from the output voltage of the shift unit 7 received at its gate. More specifically, when the potential of the signal line 3 rises to be equal to or higher than the clipping potential, the clipping unit 5 executes a source follower operation together with the constant current source 4 to decrease the potential of the signal line 3 to the clipping potential and clip the decreased potential. The clipping potential is arbitrarily set within the range of a level lower than an optical signal to a level higher than an ideal noise signal. In the second state, the clipping unit 5 receives a power supply voltage. The clipping unit 5 is turned off in accordance with the received ground voltage. In this case, the arrangement in FIG. 1 is changed so that the terminal 82 is connected to the power supply voltage and a terminal of the constant current source 4 opposite to a terminal connected to the signal line 3 is connected to the power supply voltage.

A plurality of CDS circuits 9 correspond to a plurality of signal lines 3. Each CDS circuit 9 is connected to a corresponding signal line 3. In a period for reading out a noise signal from a pixel, the CDS circuit 9 receives and temporarily holds a noise signal transferred via the signal line 3. In a period for reading out an optical signal from a pixel, the CDS circuit 9 receives and temporarily holds an optical signal which is output from a pixel and transferred via the signal line 3. The CDS circuit 9 performs correlated double sampling to generate and output a difference signal ΔVOUT between the noise signal and the optical signal. Based on the difference signal ΔVOUT output from the CDS circuit 9, an output circuit (not shown) generates and outputs an image signal. In this case, the noise signal and optical signal serve as signals for generating an image signal based on the difference between them.

The operation of the photoelectric conversion device 100 according to the first embodiment of the present invention will be explained with reference to FIG. 3. FIG. 3 is a timing chart showing the operation of the photoelectric conversion device 100 according to the first embodiment of the present invention.

In FIG. 3, the vertical scanning circuit 20 supplies the selection control signal PSEL_1 to a pixel on a readout row. The vertical scanning circuit 20 supplies the selection control signal PSEL_2 to the driving supplemental pixel 2. The vertical scanning circuit 20 supplies the reset control signal PRES to the pixel on the readout row. The vertical scanning circuit 20 supplies the transfer control signal PTX to the pixel on the readout row. The vertical scanning circuit 20 or an external timing generator 98 (see FIG. 6) supplies a control signal SHP to the holding unit 6 in order to control the holding unit 6 to hold the potential of the signal line 3. FD represents the potential of the charge-voltage converter in the pixel on the readout row. VOUT represents the potential of the signal line 3. A case in which the pixel on the readout row is the pixel 1-1 will be exemplified.

At time T1, the selection control signal PSEL_1 to be supplied to the gate of the selection unit (selection transistor) 14 of the pixel 1-1 changes to an active level to select the pixel 1-1. The reset control signal PRES to be supplied to the gate of the reset unit (reset transistor) 12 of the pixel 1-1 changes to an active level to reset the pixel 1-1. Similarly, the selection control signal PSEL_2 to be supplied to the gate of the selection unit (selection transistor) 14 of the driving supplemental pixel 2 changes to an active level to select the driving supplemental pixel 2. The reset control signal PRES to be supplied to the gate of the reset unit (reset transistor) 12 of the driving supplemental pixel 2 changes to an active level to reset the driving supplemental pixel 2 (first step).

At the same time, the control signal SHP changes to an active level to control the holding unit 6 to hold the potential of the signal line 3. In response to this, both the output unit (amplification transistor) 13 of the pixel 1-1 and the output unit (amplification transistor) of the driving supplemental pixel 2 perform a source follower operation together with the constant current source 4. Accordingly, the signal line 3 can be quickly driven to a potential corresponding to the voltage of the charge-voltage converter 15 in the pixel 1-1.

At time T2, the selection control signal PSEL_2 to be supplied to the gate of the selection unit (selection transistor) 14 of the driving supplemental pixel 2 changes to an inactive level to deselect the driving supplemental pixel 2. Then, the output unit (amplification transistor) of the driving supplemental pixel 2 stops the source follower operation (second step), preventing an output from the driving supplemental pixel 2 from affecting a signal output from the pixel on the readout row. The output unit 13 of the pixel 1-1 can easily output an appropriate noise signal to the signal line 3.

At time T3, the reset control signal PRES to be supplied to the gate of the reset unit (reset transistor) 12 of the pixel 1-1 changes to an inactive level, completely resetting the pixel 1-1. The pixel 1-1 maintains the reset state. Also, the control signal SHP changes to an inactive level to complete the operation to hold the potential of the signal line 3 by the holding unit 6. At the same time, the switching unit 8 connects the N readout terminal 81 to the connection terminal 83 to switch to the first state. In response to this, the holding unit 6 outputs a voltage corresponding to the held potential of the signal line 3 to the shift unit 7. The shift unit 7 receives the output voltage of the holding unit 6 and shifts the received output voltage of the holding unit 6. The shift unit 7 outputs the shifted voltage to the switching unit 8. In the first state, the switching unit 8 transfers the output voltage of the shift unit 7 to the clipping unit 5. Based on the received output voltage of the shift unit 7, the clipping unit 5 clips the potential of the signal line 3.

In the period between times T3 and T4, the output unit 13 of the pixel 1-1 outputs, to the signal line 3, a noise signal corresponding to the voltage of the charge-voltage converter 15 while the reset unit 12 resets the charge-voltage converter 15 (second step).

At this time, if the pixel 1-1 is irradiated with bright light, charges may leak from the photoelectric conversion unit 10 to the charge-voltage converter 15 though the transfer unit 11 in the pixel 1-1 is OFF. In this case, as the potential of the charge-voltage converter 15 in the pixel 1-1 attenuates from the reset level, the level of the noise signal output from the output unit 13 of the pixel 1-1 to the signal line 3 also attenuates, and the potential of the signal line 3 starts dropping, as represented by FD in FIG. 3. However, in response to a decrease in the potential of the signal line 3 to a clipping potential Vclip or lower, the clipping unit 5 starts a clipping operation (source follower operation) to raise the potential of the signal line 3 to the clipping potential Vclip and clip the raised potential. Hence, the potential of the signal line 3 can be prevented from attenuating to one lower than the clipping potential Vclip, i.e., from greatly attenuating from an ideal noise signal level.

To the contrary, when the potential of the signal line 3 is higher than the clipping potential Vclip, the clipping unit 5 does not perform a clipping operation. In this case, the signal line 3 has a potential corresponding to a noise signal output from the pixel 1-1.

Upon receiving an active-level N readout control signal (not shown) from the vertical scanning circuit 20 or the timing generator 98 (see FIG. 6), the CDS circuit 9 receives and temporarily holds the noise signal transferred via the signal line 3. That is, when the clipping unit 5 performs a clipping operation, the CDS circuit 9 receives and temporarily holds a signal corresponding to the clipping potential Vclip as a noise signal. When the clipping unit 5 does not execute a clipping operation, the CDS circuit 9 receives and temporarily holds a noise signal which is output from the pixel 1-1 and transferred via the signal line 3.

At time T4, the transfer control signal PTX to be supplied to the gate of the transfer unit (transfer transistor) 11 of the pixel 1-1 changes to an active level to transfer charges from the photoelectric conversion unit 10 to the charge-voltage converter 15 in the pixel 1-1. In contrast, the transfer control signal to be supplied to the gate of the transfer unit (transfer transistor) 11 of the driving supplemental pixel 2 remains inactive, and no charge is transferred from the photoelectric conversion unit 10 to the charge-voltage converter 15 in the driving supplemental pixel 2.

At time T5, the output unit 13 of the pixel 1-1 outputs, to the signal line 3, an optical signal corresponding to the voltage of the charge-voltage converter 15 while the transfer unit 11 transfers charges from the photoelectric conversion unit 10 to the charge-voltage converter 15 (third step). Upon receiving an active-level S readout control signal (not shown) from the vertical scanning circuit 20 or the timing generator 98 (see FIG. 6), the CDS circuit 9 receives and temporarily holds the optical signal transferred via the signal line 3. The CDS circuit 9 executes correlated double sampling to generate and output the difference signal ΔVOUT between the noise signal and the optical signal. Based on the difference signal ΔVOUT output from the CDS circuit 9, the output circuit (not shown) generates and outputs an image signal.

In this way, during the first period TP1 in a selection period for selecting the pixel (readout pixel) 1-1, both the output unit 13 of the pixel 1-1 and the output unit 13 of the driving supplemental pixel (driving supplemental element) 2 output noise signals to the signal line 3 (first step). During the second period TP2 which follows the first period TP1 and which is in the selection period, the output unit 13 of the driving supplemental pixel 2 stops output of the noise signal to the signal line 3 while the noise signal output from the output unit 13 of the pixel 1-1 to the signal line 3 is transferred to the CDS circuit 9 (second step). During the third period TP3 in the selection period, an optical signal output from the pixel 1-1 to the signal line 3 is transferred to the CDS circuit 9 (third step).

More specifically, in the first period TP1, both the output unit (amplification transistor) 13 of the pixel 1-1 and the output unit (amplification transistor) of the driving supplemental pixel 2 perform a source follower operation together with the constant current source 4. The signal line 3 can be quickly driven to a potential corresponding to the voltage of the charge-voltage converter 15 in the pixel 1-1 as compared with a case in which one output unit (amplification transistor) performs the source follower operation together with the constant current source 4. In other words, even when the first period TP1 is shortened, the potential of the signal line 3 can be changed to one corresponding to the voltage of the charge-voltage converter 15 in the pixel 1-1. In the second period TP2, the output unit (amplification transistor) of the driving supplemental pixel 2 stops the source follower operation, preventing an output from the driving supplemental pixel 2 from affecting a signal output from a pixel on a readout row. The output unit 13 of the pixel 1-1 can easily output an appropriate noise signal to the signal line 3.

Even when the potential of the signal line 3 is set to one corresponding to the voltage of the charge-voltage converter 15 in the pixel 1-1, the period (TP1 and TP2) for reading out an appropriate noise signal from the pixel 1-1 can be shortened. That is, the period for transferring an appropriate noise signal from a pixel to the output circuit can be shortened.

At the timing when the second period TP2 starts, the potential of the signal line 3 changes to one corresponding to the voltage of the charge-voltage converter 15 in the pixel 1-1. Even if the potential of the signal line 3 drops later, it can be clipped to a proper clipping potential Vclip. This can prevent a departure of the clipping potential caused by a signal line potential which does not sufficiently rise to a potential corresponding to the voltage of the charge-voltage converter in a pixel on a readout row. As a result, the high-brightness darkening phenomenon can be fully suppressed.

The first embodiment can therefore suppress the high-brightness darkening phenomenon and shorten the period (TP1 to TP3) for transferring signals (noise signal and optical signal) from a pixel to the CDS circuit.

In the pixel array PA, driving supplemental pixels may be arranged on a plurality of rows. In other words, a plurality of driving supplemental pixels may be connected to the signal line 3. In this case, in the first period TP1, the vertical scanning circuit 20 drives a plurality of pixels and a plurality of driving supplemental pixels so that the output unit of a pixel on a readout row and those of the respective driving supplemental pixels output noise signals to the signal line 3. In the second period TP2, the vertical scanning circuit 20 drives a plurality of driving supplemental pixels to stop output of noise signals from their output units to the signal line. By driving the pixel array in this manner, the ability to drive the signal line potential by the output unit (amplification transistor) of the pixel can be improved, coping with a higher-speed readout operation.

Figure 4:
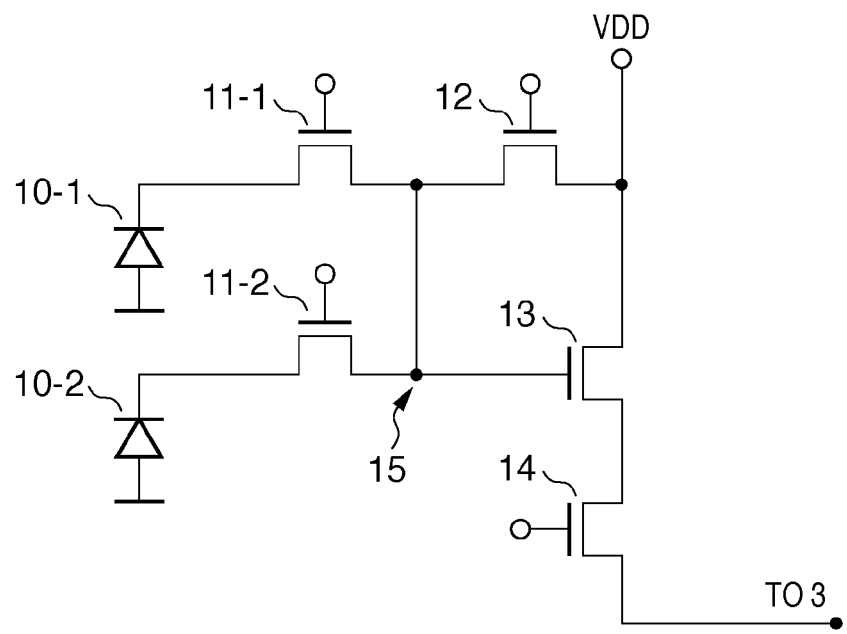
FIG. 4 is a circuit diagram showing the structure of a pixel or driving supplemental pixel in a modification to the first embodiment of the present invention.

Each of the pixel and driving supplemental pixel in the pixel array PA may have a structure shown in FIG. 4. In the pixel shown in FIG. 4, two photoelectric conversion units 10-1 and 10-2 and two transfer units 11-1 and 11-2 share the charge-voltage converter 15, reset unit 12, output unit 13, and selection unit 14. In this case, the number of elements (transistors) in the pixel array PA can be decreased. This makes it easy to reduce the area of one photoelectric conversion unit in the pixel array PA and increase the number of pixels in the pixel array PA. FIG. 4 is a circuit diagram showing the structure of a pixel or driving supplemental pixel in a modification to the first embodiment of the present invention.

Figure 5:
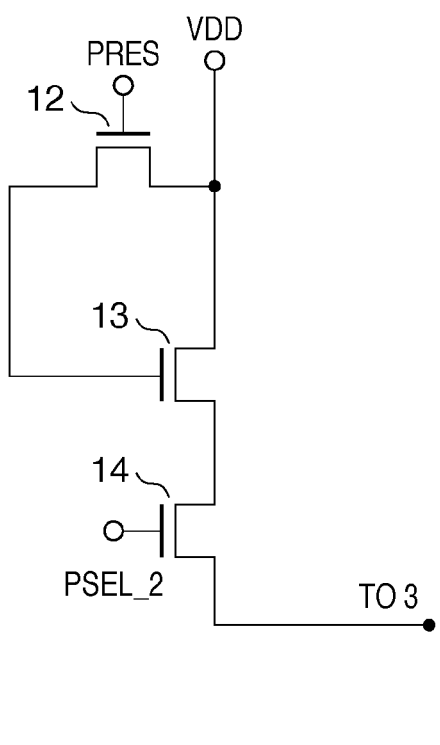
FIG. 5 is a circuit diagram showing the structure of a pixel or driving supplemental pixel in another modification to the first embodiment of the present invention.

The structure of the driving supplemental pixel may be different from that of the pixels 1-1 to 1-N. For example, the driving supplemental pixel may be a light-shielded pixel to shield the photoelectric conversion unit 10 from light. As another example, the gate of the transfer unit (transfer transistor) 11 in the driving supplemental pixel may be fixed to an OFF-level potential (e.g., ground potential). As still another example, a driving supplemental pixel 2i may include neither the photoelectric conversion unit 10 nor transfer unit 11 (see FIG. 2), as shown in FIG. 5. Also in these examples, the driving supplemental pixel need not output a stored signal and suffices to be used to drive the potential of the signal line. The driving supplemental pixel 2i having no photoelectric conversion unit (photodiode) is free from blooming of charges, and can obtain the driving force of the amplification transistor regardless of the intensity of incident light. FIG. 5 is a circuit diagram showing the structure of a pixel or driving supplemental pixel in another modification to the first embodiment of the present invention.

Further, the photoelectric conversion device may be, for example, a line sensor. In this case, a plurality of pixels in the pixel array are arrayed in the column direction and connected to one signal line.

Figure 6:
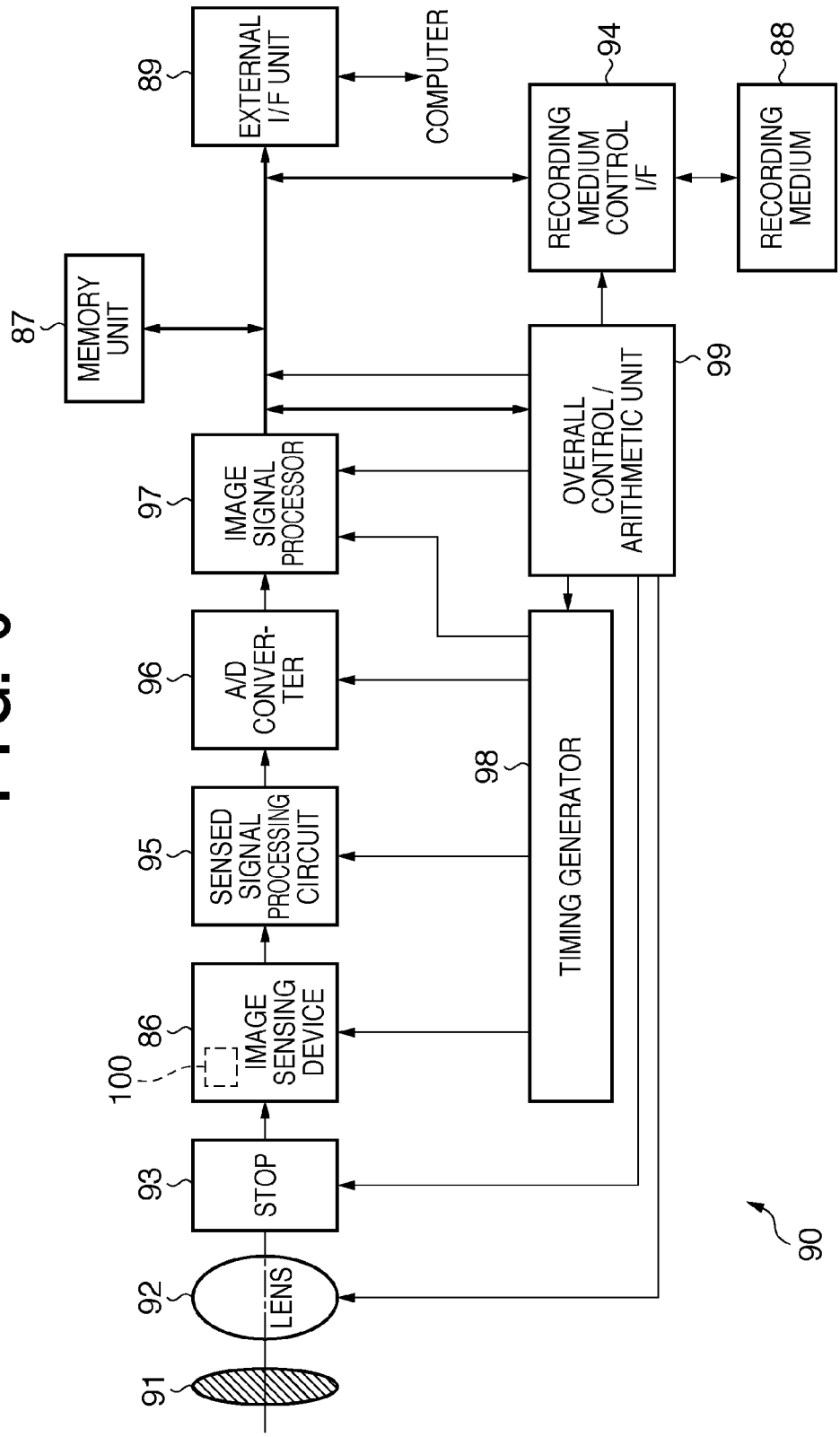
FIG. 6 is a block diagram of an imaging system to which the photoelectric conversion device according to the first embodiment is applied.

FIG. 6 exemplifies an imaging system to which the photoelectric conversion device of the present invention is applied.

As shown in FIG. 6, an imaging system 90 mainly includes an optical system, image sensing apparatus 86, and signal processing unit. The optical system mainly includes a shutter 91, lens 92, and stop 93. The image sensing apparatus 86 includes the photoelectric conversion device 100. The signal processing unit mainly includes a sensed signal processing circuit 95, an A/D converter 96, an image signal processor 97, a memory 87, an external I/F 89, the timing generator 98, an overall control/arithmetic unit 99, a recording medium 88, and a recording medium control I/F 94. The signal processing unit may not include the recording medium 88.

The shutter 91 is arranged in front of the lens 92 on the optical path to control the exposure.

The lens 92 refracts incident light to form an object image on the image sensing surface of the photoelectric conversion device 100 of the image sensing apparatus 86.

The stop 93 is interposed between the lens 92 and the photoelectric conversion device 100 on the optical path. The stop 93 adjusts the quantity of light guided to the photoelectric conversion device 100 after passing through the lens 92.

The photoelectric conversion device 100 of the image sensing apparatus 86 converts an object image formed on the image sensing surface of the photoelectric conversion device 100 into an image signal. The image sensing apparatus 86 reads out the image signal from the photoelectric conversion device 100, and outputs it.

The sensed signal processing circuit 95 is connected to the image sensing apparatus 86, and processes an image signal output from the image sensing apparatus 86.

The A/D converter 96 is connected to the sensed signal processing circuit 95. The A/D converter 96 converts a processed image signal (analog signal) output from the sensed signal processing circuit 95 into an image signal (digital signal).

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., personal computer) via the external I/F 89.

The timing generator 98 is connected to the image sensing apparatus 86, sensed signal processing circuit 95, A/D converter 96, and image signal processor 97. The timing generator 98 supplies timing signals to the image sensing apparatus 86, sensed signal processing circuit 95, A/D converter 96, and image signal processor 97. The image sensing apparatus 86, sensed signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

With this arrangement, the photoelectric conversion device 100 can provide a high-quality image (image data) as long as it can obtain a high-quality image signal.

Figure 7:
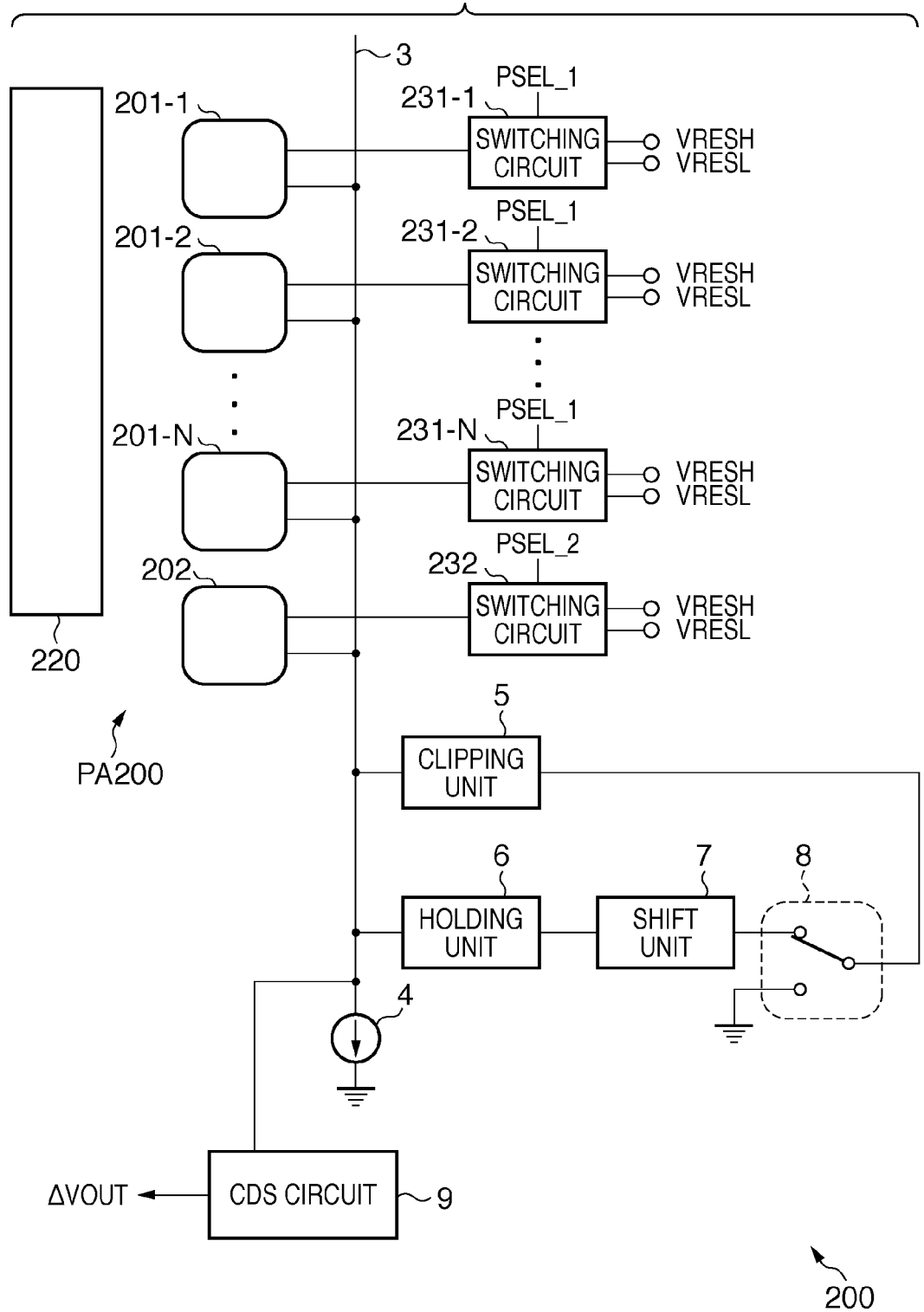
FIG. 7 is a diagram showing the circuit arrangement of a photoelectric conversion device 200 according to the second embodiment of the present invention.

A photoelectric conversion device 200 according to the second embodiment of the present invention will be described with reference to FIG. 7. FIG. 7 is a diagram showing the circuit arrangement of the photoelectric conversion device 200 according to the second embodiment of the present invention. A difference of the second embodiment from the first embodiment will be mainly explained.

The photoelectric conversion device 200 includes a plurality of pixels 201-1 to 201-N, a plurality of driving supplemental pixels 202, and a vertical scanning circuit (driving unit) 220.

Figure 8:
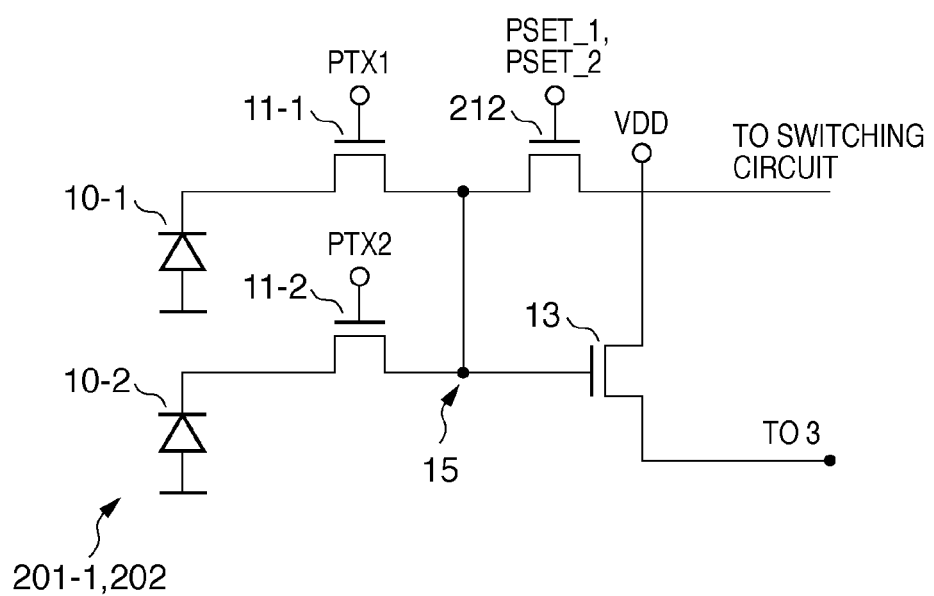
FIG. 8 is a circuit diagram showing the structure of a pixel or driving supplemental pixel in the second embodiment of the present invention.

The pixels 201-1 to 201-N and each driving supplemental pixel (driving supplemental element) 202 have the same structure, for example, a structure shown in FIG. 8. FIG. 8 is a circuit diagram showing the structure of the pixel or driving supplemental pixel in the second embodiment of the present invention.

The pixel (each of the pixels 201-1 to 201-N and the driving supplemental pixel 202) shown in FIG. 8 includes photoelectric conversion units 10-1 and 10-2, transfer units 11-1 and 11-2, and a reset unit 212 without including a reset unit 12 and selection unit 14 (see FIG. 2). In the pixel shown in FIG. 8, the two photoelectric conversion units 10-1 and 10-2 and the two transfer units 11-1 and 11-2 share a charge-voltage converter 15, the reset unit 212, and an output unit 13, and the selection unit 14 is omitted. The selected state/deselected state of the pixel shown in FIG. 8 is controlled by the potential of the charge-voltage converter 15. In this case, the number of elements (transistors) in a pixel array PA200 can be decreased. This makes it easy to reduce the area of one photoelectric conversion unit in the pixel array PA200 and increase the number of pixels in the pixel array PA200.

The photoelectric conversion unit 10-1 generates charges corresponding to light and stores them. The photoelectric conversion unit 10-1 is, for example, a photodiode.

The transfer unit 11-1 transfers charges from the photoelectric conversion unit 10-1 to the charge-voltage converter 15. The transfer unit 11-1 is, for example, a transfer transistor. When the vertical scanning circuit 220 supplies an active-level first transfer control signal PTX1 to the gate, the transfer unit 11-1 is turned on to transfer charges from the photoelectric conversion unit 10-1 to the charge-voltage converter 15.

The photoelectric conversion unit 10-2 generates charges corresponding to light and stores them. The photoelectric conversion unit 10-2 is, for example, a photodiode.

The transfer unit 11-2 transfers charges from the photoelectric conversion unit 10-2 to the charge-voltage converter 15. The transfer unit 11-2 is, for example, a transfer transistor. When the vertical scanning circuit 220 supplies an active-level second transfer control signal PTX2 to the gate, the transfer unit 11-2 is turned on to transfer charges from the photoelectric conversion unit 10-2 to the charge-voltage converter 15. When the charge-voltage converter 15 adds the charges of the photoelectric conversion units 10-1 and 10-2, both the first transfer control signal PTX1 and second transfer control signal PTX2 have the same waveform as that of the transfer control signal PTX shown in FIG. 3. When the charge-voltage converter 15 does not add the charges of the photoelectric conversion units 10-1 and 10-2, the waveforms of the first transfer control signal PTX1 and second transfer control signal PTX2 change to an active level at different timings in the third period TP3.

The reset unit 212 sets the potential of the charge-voltage converter 15 to either the first potential at which a pixel is selected and reset or the second potential at which a pixel is deselected. The reset units 212 of the pixels 201-1 to 201-N are, for example, reset transistors. When the vertical scanning circuit 220 supplies an active-level setting control signal PSET_1 to the gates, the reset units 212 are turned on. When corresponding switching circuits supply a High reset voltage VRESH to the drains, the reset units 212 of the pixels 201-1 to 201-N set the corresponding charge-voltage converters 15 to the first potential. When the switching circuits supply a Low reset voltage VRESL to the drains, the reset units 212 of the pixels 201-1 to 201-N set the corresponding charge-voltage converters 15 to the second potential. Similarly, the reset unit 212 of the driving supplemental pixel 202 is, for example, a setting transistor. When the vertical scanning circuit 220 supplies an active-level setting control signal PSET_2 to the gate, the reset unit 212 of the driving supplemental pixel 202 is turned on. Then, when the switching circuits supplies the High reset voltage VRESH to the drains, the reset units 212 of the pixels 201-1 to 201-N set the corresponding charge-voltage converters 15 to the first potential. When the switching circuits supply the Low reset voltage VRESL to the drains, the reset units 212 of the pixels 201-1 to 201-N set the corresponding charge-voltage converters 15 to the second potential.

A plurality of switching circuits 231-1 to 231-N shown in FIG. 7 correspond to a plurality of pixels 201-1 to 201-N. The switching circuits 231-1 to 231-N are connected to the drains of the reset units 212 of the corresponding pixels 201-1 to 201-N. When the vertical scanning circuit 220 supplies an active-level selection control signal PSEL_1 to the gates, the switching circuits 231-1 to 231-N supply the High reset voltage VRESH to the pixels to select and reset them. When the vertical scanning circuit 220 supplies an inactive-level selection control signal PSEL_1 to the gates, the switching circuits 231-1 to 231-N supply the Low reset voltage VRESL to the pixels to deselect them. Note that the selection control signal PSEL_1 has the same waveform as that shown in FIG. 3.

A switching circuit 232 shown in FIG. 7 is connected to the drain of the reset unit 212 of the driving supplemental pixel 202. When the vertical scanning circuit 220 supplies an active-level selection control signal PSEL_2 to the gate, the switching circuit 232 supplies the High reset voltage VRESH to the pixel to select and reset it. When the vertical scanning circuit 220 supplies an inactive-level selection control signal PSEL_2 to the gate, the switching circuit 232 supplies the Low reset voltage VRESL to the pixel to deselect it. Note that the selection control signal PSEL_2 has the same waveform as that shown in FIG. 3.

In the first period TP1 (see FIG. 3), the vertical scanning circuit 220 drives the pixel array PA200 so that the reset unit 212 of a pixel on a readout row sets the potential of the charge-voltage converter 15 to the first potential. In addition, the vertical scanning circuit 220 drives the pixel array PA200 so that the reset unit 212 of the driving supplemental pixel 202 sets the potential of the charge-voltage converter 15 to the first potential. As a result, the vertical scanning circuit 220 selects and resets the pixel on the readout row and the driving supplemental pixel in the first period TP1.

In the second period TP2 (see FIG. 3), the vertical scanning circuit 220 drives the pixel array PA200 so that the reset unit 212 of the driving supplemental pixel 202 sets the potential of the charge-voltage converter 15 to the second potential. In the pixel on the readout row, the reset unit 212 keeps setting the potential of the charge-voltage converter 15 at the first potential. At this time, in the second period TP2, the vertical scanning circuit 220 drives the pixel array PA200 so that the output unit 13 of the pixel on the readout row outputs, to a signal line 3, a noise signal corresponding to the voltage of the charge-voltage converter 15 set at the first potential. Accordingly, the vertical scanning circuit 220 deselects the driving supplemental pixel, and outputs a noise signal from the pixel on the readout row to the signal line 3 in the second period TP2.

In the third period TP3 (see FIG. 3), the vertical scanning circuit 220 drives the pixel array PA200 as follows. The vertical scanning circuit 220 drives the pixel array PA200 so that the output unit 13 of the pixel on the readout row outputs, to the signal line 3, an optical signal corresponding to the voltage of the charge-voltage converter 15 while the transfer unit 11-1 transfers charges from the photoelectric conversion unit 10-1 to the charge-voltage converter 15. Also, the vertical scanning circuit 220 drives the pixel array PA200 so that the output unit 13 of the pixel on the readout row outputs, to the signal line 3, an optical signal corresponding to the voltage of the charge-voltage converter 15 while the transfer unit 11-2 transfers charges from the photoelectric conversion unit 10-2 to the charge-voltage converter 15. By this operation, in the third period TP3, the vertical scanning circuit 220 drives the pixel on the readout row to output, to the signal line 3, the sum of an optical signal corresponding to the photoelectric conversion unit 10-1 and that corresponding to the photoelectric conversion unit 10-2. Alternatively, in the third period TP3, the vertical scanning circuit 220 drives the pixel on the readout row to output, to the signal line 3, an optical signal corresponding to the photoelectric conversion unit 10-1 and that corresponding to the photoelectric conversion unit 10-2 at different timings.

A pixel may be selected not by changing the drain voltage of the reset unit (reset transistor) 212 but by changing the drain voltage of the output unit (amplification transistor) 13. Alternatively, a pixel may be selected by changing the potential of the signal line 3. It will readily occur to those skilled in the art that even this arrangement can perform the same driving as the foregoing one and attain the same effects.

Each of the pixels 201-1 to 201-N and driving supplemental pixel 202 may have the same structure as that of the pixel in the first embodiment. Alternatively, in each of the pixels 201-1 to 201-N and driving supplemental pixel 202, three or more photoelectric conversion units and three or more transfer units may share the charge-voltage converter, reset unit, output unit, and selection unit. In this case, the number of elements (transistors) in the pixel array PA200 can be further decreased. This makes it easy to reduce the area of a portion corresponding to one photoelectric conversion unit in the pixel array PA200 and increase the number of pixels in the pixel array PA200.

Figure 9:
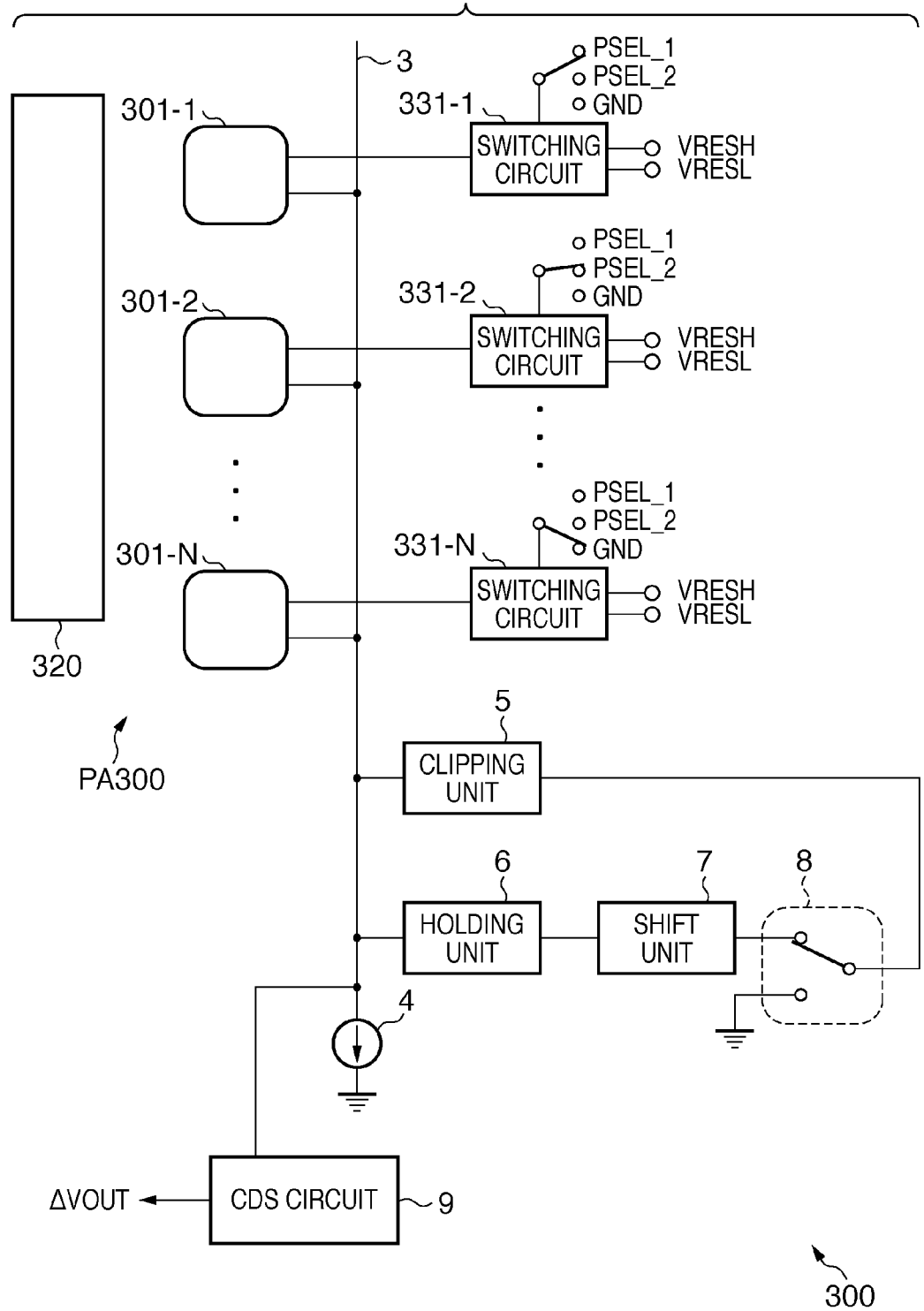
FIG. 9 is a diagram showing the circuit arrangement of a photoelectric conversion device 300 according to the third embodiment of the present invention.

A photoelectric conversion device 300 according to the third embodiment of the present invention will be described with reference to FIG. 9. FIG. 9 is a diagram showing the circuit arrangement of the photoelectric conversion device 300 according to the third embodiment of the present invention. A difference of the third embodiment from the first and second embodiments will be mainly explained.

The photoelectric conversion device 300 includes a plurality of pixels 301-1 to 301-N and a vertical scanning circuit (driving unit) 320 without a plurality of driving supplemental pixels 2 (see FIG. 1). All pixels in a pixel array PA300 are formed from normal pixels to undergo readout.

A plurality of switching circuits 331-1 to 331-N shown in FIG. 9 correspond to a plurality of pixels 301-1 to 301-N. The switching circuits 331-1 to 331-N are connected to the drains of reset units (reset transistors) 212 (see FIG. 8) in the corresponding pixels 301-1 to 301-N. The switching circuits 331-1 to 331-N switch and perform three types of operations PSEL_1, PSEL_2, and GND (fixed at Low). When the vertical scanning circuit 320 supplies the selection control signal PSEL_1, the switching circuits 331-1 to 331-N operate the corresponding pixels 301-1 to 301-N as pixels (readout pixels) on readout rows. When the vertical scanning circuit 320 supplies the control signal GND, the switching circuits 331-1 to 331-N operate the corresponding pixels as pixels (non-readout pixels) on non-readout rows. When the vertical scanning circuit 320 supplies the selection control signal PSEL_2, the switching circuits 331-1 to 331-N operate the corresponding pixels 301-1 to 301-N as pixels (non-readout pixels) on non-readout rows and driving supplemental pixels (driving supplemental elements). FIG. 9 shows a state in which the switching circuit 331-1 receives the selection control signal PSEL_1, the switching circuit 331-2 receives the selection control signal PSEL_2, and the switching circuits 331-3 to 331-N receive the control signal GND. That is, in FIG. 9, the pixel 301-1 functions as a pixel on a readout row, the pixel 301-2 functions as a pixel on a non-readout row and a driving supplemental pixel, and the pixels 301-3 to 301-N function as pixels on non-readout rows.

Another selection period is arranged to operate, as a readout pixel, the pixel 301-2 which operated as a driving supplemental pixel in the selection period of the pixel 301-1. During the first period in the other selection period, both an output unit 13 of the pixel 301-2 and that of, for example, the pixel (at least one non-readout pixel) 301-2 serving as a driving supplemental pixel output noise signals to a signal line 3 (fourth step). During the second period following the first period in the other selection period, the output unit 13 of the pixel 301-3 stops output of the noise signal to the signal line 3. At the same time, the noise signal output from the output unit 13 of the pixel 301-2 to the signal line 3 is transferred to a CDS circuit 9 (fifth step). During the third period in the other selection period, an optical signal output from the pixel 301-2 to the signal line 3 is transferred to the CDS circuit 9.

Higher-speed readout can be done by increasing, by two or more rows, the number of pixels operating based on the selection control signal PSEL_2. However, a larger number of pixels operating based on the selection control signal PSEL_2 increase the number of reset units (reset transistors) which are turned on at time T1 (see FIG. 3). The VOUT voltage greatly changes, and the operation speed may decrease. From this, the number of pixels operating based on the selection control signal PSEL_2 can be set to several pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318939, filed Dec. 15, 2008, which is hereby incorporated by reference herein in its entirety.

What is claimed is:

1. A photoelectric conversion device comprising:
a plurality of pixels;
a driving supplemental element;
a signal line to which the plurality of pixels and the driving supplemental element are connected;
a driving unit which drives the plurality of pixels and the driving supplemental element; and
an output circuit which processes a signal output to the signal line from a readout pixel selected by the driving unit and outputs the processed signal,
each of the plurality of pixels including:
  a first charge-voltage converter;
  a first reset unit which resets the first charge-voltage converter; and
  a first output unit which outputs a signal corresponding to a voltage of the first charge-voltage converter,
the driving supplemental element including:
  a second charge-voltage converter;
  a second reset unit which resets the second charge-voltage converter; and
  a second output unit which outputs a signal corresponding to a voltage of the second charge-voltage converter,
wherein the driving unit drives the plurality of pixels and the driving supplemental element to, during a first period which is in a selection period for selecting the readout pixel, in the readout pixel, reset the first charge-voltage converter by the first reset unit and then output a noise signal corresponding to the voltage of the first charge-voltage converter from the first output unit to the signal line, and in the driving supplemental element, reset the second charge-voltage converter by the second reset unit and then output a noise signal corresponding to the voltage of the second charge-voltage converter from the second output unit to the signal line, and in a second period which follows the first period and which is in the selection period, stop output of the noise signal to the signal line from the second output unit in the driving supplemental element, and
the noise signal output to the signal line from the first output unit in the readout pixel is transferred to the output circuit in the second period.

2. The device according to claim 1, wherein
each of the plurality of pixels further includes a first selection unit which selects or deselects the pixel,
the driving supplemental element further includes a second selection unit which selects or deselects the driving supplemental element, and
the driving unit drives the plurality of pixels and the driving supplemental element to, during the first period, select the readout pixel by the first selection unit in the readout pixel and select the driving supplemental element by the second selection unit in the driving supplemental element, and during the second period, deselect the driving supplemental element by the second selection unit in the driving supplemental element.

3. The device according to claim 2, wherein
each of the plurality of pixels further includes
  a first photoelectric conversion unit, and
  a first transfer unit which transfers charges from the first photoelectric conversion unit to the first charge-voltage converter, and
the driving unit drives the plurality of pixels to, during a third period in the selection period, output an optical signal corresponding to the voltage of the first charge-voltage converter to the signal line from the first output unit in the readout pixel while the first transfer unit transfers charges from the first photoelectric conversion unit to the first charge-voltage converter.

4. The device according to claim 3, wherein the driving supplemental element does not include a photoelectric conversion unit, includes a light-shielded second photoelectric conversion unit, or includes a second photoelectric conversion unit and does not transfer charges from the second photoelectric conversion unit to the second charge-voltage converter.

5. The device according to claim 3, wherein
the driving supplemental element further includes
  a second photoelectric conversion unit, and
  a second transfer unit which transfers charges from the second photoelectric conversion unit to the second charge-voltage converter, and
the driving unit drives the driving supplemental element as a non-readout pixel which does not transfer a signal to the output circuit in the selection period, and drives the driving supplemental element as the readout pixel and a non-readout period as the driving supplemental element in a second selection period.

6. The device according to claim 1, wherein
the first reset unit resets the first charge-voltage converter and selects the pixel by setting a potential of the first charge-voltage converter to a first potential, and deselects the pixel by setting the potential of the first charge-voltage converter to a second potential,
the second reset unit resets the second charge-voltage converter and selects the driving supplemental element by setting a potential of the second charge-voltage converter to the first potential, and deselects the driving supplemental element by setting the potential of the second charge-voltage converter to the second potential, and
the driving unit drives the plurality of pixels and the driving supplemental element to, during the first period, set the potential of the first charge-voltage converter to the first potential by the first reset unit in the readout pixel and set the potential of the second charge-voltage converter to the first potential by the second reset unit in the driving supplemental element, and during the second period, set the potential of the second charge-voltage converter to the second potential by the second reset unit in the driving supplemental element.

7. The device according to claim 1, wherein
the driving supplemental element includes a plurality of driving supplemental elements connected to the signal lines, and
the driving unit drives the plurality of driving supplemental elements to, during the first period, output the noise signal corresponding to the voltage of the second charge-voltage converter to the signal line from the second output unit in each of the plurality of driving supplemental elements while the second reset unit resets the second charge-voltage converter, and during the second period, stop output of the noise signal to the signal line from the second output unit in each of the plurality of driving supplemental elements.

8. The device according to claim 1, further comprising:
a holding unit which holds a potential of the signal line while the readout pixel outputs a noise signal to the signal line during the second period;
a shift unit which shifts an output voltage of the holding unit; and
a clipping unit which clips the potential of the signal line in accordance with an output voltage of the shift unit.

9. An imaging system comprising:
a photoelectric conversion device defined in claim 1;
an optical system which forms an image on an image sensing surface of the photoelectric conversion device; and
a signal processing unit which processes a signal output from the photoelectric conversion device to generate image data.

10. A method of driving a photoelectric conversion device including a plurality of pixels, a driving supplemental element, a signal line to which the plurality of pixels and the driving supplemental element are connected, and an output circuit which processes a signal output to the signal line from a readout pixel selected from the plurality of pixels to read out a signal and outputs the processed signal,
each of the plurality of pixels including:
a first charge-voltage converter;
a first reset unit which resets the first charge-voltage converter; and
a first output unit which outputs a signal corresponding to a voltage of the first charge-voltage converter,
the driving supplemental element including:
a second charge-voltage converter;
a second reset unit which resets the second charge-voltage converter; and
a second output unit which outputs a signal corresponding to a voltage of the second charge-voltage converter,
the driving method comprising:
a first step of driving the plurality of pixels and the driving supplemental element to, in the readout pixel, reset the first charge-voltage converter by the first reset unit and then output a noise signal corresponding to the voltage of the first charge-voltage converter from the first output unit to the signal line, and in the driving supplemental element, reset the second charge-voltage converter by the second reset unit and then output a noise signal corresponding to the voltage of the second charge-voltage converter from the second output unit to the signal line; and
a second step of driving the driving supplemental element to stop output of the noise signal to the signal line from the second output unit in the driving supplemental element after the first step,
wherein in the second step, the noise signal output to the signal line from the first output unit in the readout pixel is transferred to the output circuit.

11. The method according to claim 10, wherein
each of the plurality of pixels further includes a first selection unit which selects or deselects the pixel,
the driving supplemental element further includes a second selection unit which selects or deselects the driving supplemental element,
in the first step, the plurality of pixels and the driving supplemental element are driven to select the readout pixel by the first selection unit in the readout pixel and select the driving supplemental element by the second selection unit in the driving supplemental element, and
in the second step, the plurality of pixels and the driving supplemental element are driven to deselect the driving supplemental element by the second selection unit in the driving supplemental element.

12. The method according to claim 11, wherein
each of the plurality of pixels further includes
a first photoelectric conversion unit, and
a first transfer unit which transfers charges from the first photoelectric conversion unit to the first charge-voltage converter, and
the driving method further comprises a third step of driving the plurality of pixels to output an optical signal corresponding to the voltage of the first charge-voltage converter to the signal line from the first output unit in the readout pixel while the first transfer unit transfers charges from the first photoelectric conversion unit to the first charge-voltage converter.

13. The method according to claim 12, wherein the driving supplemental element does not include a photoelectric conversion unit, includes a light-shielded second photoelectric conversion unit, or includes a second photoelectric conversion unit and does not transfer charges from the second photoelectric conversion unit to the second charge-voltage converter.

14. The method according to claim 12, wherein
the driving supplemental element further includes
a second photoelectric conversion unit, and
a second transfer unit which transfers charges from the second photoelectric conversion unit to the second charge-voltage converter,
the driving method further comprises
a fourth step of driving the plurality of pixels and the driving supplemental element to output the noise signal corresponding to the voltage of the second charge-voltage converter to the signal line from the second output unit in the driving supplemental element serving as the readout pixel while the second reset unit resets the second charge-voltage converter, and output the noise signal corresponding to the voltage of the first charge-voltage converter to the signal line from the first output unit in at least one non-readout pixel while the first reset unit resets the first charge-voltage converter, and
a fifth step of driving the plurality of pixels to stop output of the noise signal to the signal line from the first output unit in the at least one non-readout pixel, and in the fifth step, the noise signal output to the signal line from the second output unit in the driving supplemental element is transferred to the output circuit.

15. The method according to claim 10, wherein
the first reset unit resets the first charge-voltage converter and selects the pixel by setting a potential of the first charge-voltage converter to a first potential, and deselects the pixel by setting the potential of the first charge-voltage converter to a second potential,
the second reset unit resets the second charge-voltage converter and selects the driving supplemental element by setting a potential of the second charge-voltage converter to the first potential, and deselects the driving supplemental element by setting the potential of the second charge-voltage converter to the second potential,
in the first step, the plurality of pixels and the driving supplemental element are driven to set the potential of the first charge-voltage converter to the first potential by the first reset unit in the readout pixel and set the potential of the second charge-voltage converter to the first potential by the second reset unit in the driving supplemental element, and
in the second step, the driving supplemental element is driven to set the potential of the second charge-voltage converter to the second potential by the second reset unit in the driving supplemental element.

16. The method according to claim 10, wherein
the driving supplemental element includes a plurality of driving supplemental elements connected to the signal lines,
in the first step, the plurality of driving supplemental elements are driven to output the noise signal corresponding to the voltage of the second charge-voltage converter to the signal line from the second output unit in each of the plurality of driving supplemental elements while the second reset unit resets the second charge-voltage converter, and
in the second step, the plurality of driving supplemental elements are driven to stop output of the noise signal to the signal line from the second output unit in each of the plurality of driving supplemental elements.

17. The method according to claim 10, wherein
the photoelectric conversion device further includes
a holding unit which holds a potential of the signal line,
a shift unit which shifts an output voltage of the holding unit, and
a clipping unit which clips the potential of the signal line in accordance with an output voltage of the shift unit, and
in the second step, the holding unit holds a potential of the signal line while the readout pixel outputs a noise signal to the signal line.

* * * * *